Oct. 19, 1965    C. L. WEIMER ETAL    3,213,405
ELECTRICAL POWER DISTRIBUTION
Original Filed Oct. 13, 1960
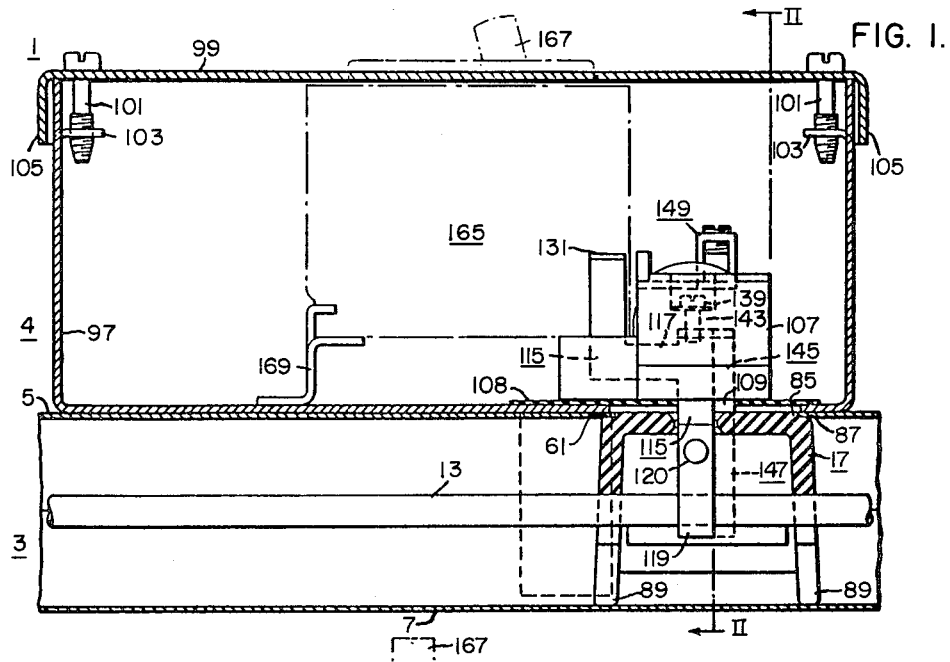
FIG. 1.
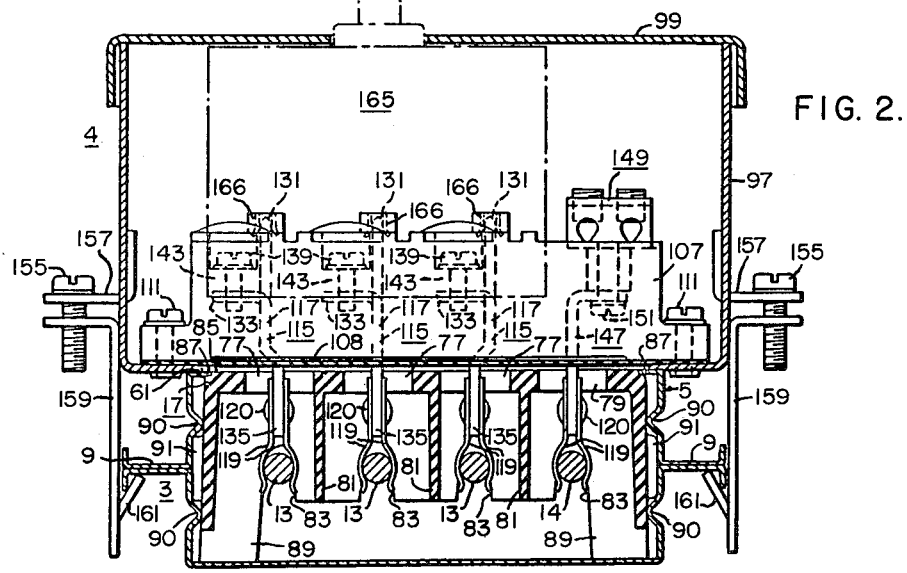
FIG. 2.
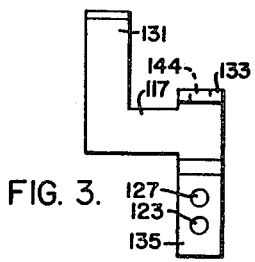
FIG. 3.
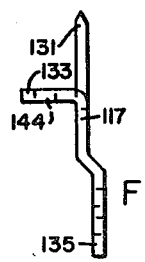
FIG. 4.
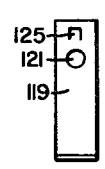
FIG. 6.
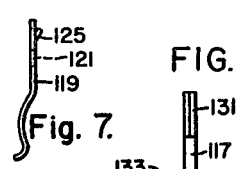
FIG. 5.
Fig. 7.

United States Patent Office 3,213,405
Patented Oct. 19, 1965

3,213,405
ELECTRICAL POWER DISTRIBUTION
Charles L. Weimer, Beaver Falls, and Samuel S. Fouse, Aliquippa, Pa., assignors to Westinghouse Electric Corporation, East Pittsburgh, Pa., a corporation of Pennsylvania
Original application Oct. 13, 1960, Ser. No. 62,502, now Patent No. 3,173,733, dated Mar. 16, 1965. Divided and this application May 25, 1964, Ser. No. 369,806
3 Claims. (Cl. 339—154)

This application is a division of the parent application Serial No. 62,502, now Patent No. 3,173,733 issued March 16, 1965.

This invention relates generally to plug-in-type bus duct systems of electrical power distribution and more particularly to bus duct plug-in units.

An object of this invention is to provide a plug-in unit embodying an improved electrical connector.

Other objects of the invention will be explained fully hereinafter or will be apparent to those skilled in the art.

In accordance with one embodiment of this invention, a bus duct plug-in unit includes a plurality of improved electrical connectors each of which comprises a one-piece stab member to which is attached two spring clips that clip onto one of the bus bars when the plug-in unit is mounted in position. This one-piece stab member has an upper part that serves as a stab for making an electrical connection with a circuit breaker mounted within the housing of the plug-in unit, an intermediate part that is bent over to support the stab member on an insulating mounting block and a lower part that extends out through the bottom of the housing of the plug-in unit. The two spring clips are attached to the lower part of the one-piece stab member.

For a better understanding of the nature and objects of the invention, reference may be had to the following detailed description, taken in conjunction with the accompanying drawings, in which:

FIGURE 1 is a side view partly in section of a part of a bus duct system of electrical power distribution illustrating certain features of the invention;

FIG. 2 is a view taken substantially along line II—II of FIG. 1;

FIGS. 3, 4 and 5 are elevational, side and top views, respectively, of the stab member of the electrical connector of the invention; and FIGS. 6 and 7 are elevational and side views, respectively, of one of the clip members for one of the electrical connectors.

Referring to the drawings and particularly to FIGS. 1 and 2, a part 1 of a bus duct system of electrical power distribution comprises a section of bus duct shown partially at 3 and a plug-in unit 4 connected to tap power off of the bus duct. The section of bus duct 3 comprises a housing comprising a generally U-shaped sheet-steel upper part 5 and a similar lower part 7. The parts 5 and 7 are connected together at flange portions 9 at each of two opposite sides thereof by means of a plurality of bolts (not shown). Three phase-carrying bus bars 13 and one neutral bus bar 14 are supported within the housing in a generally parallel relationship by means of a plurality of insulating bus bar support members of the plug-in type indicated generally at 17. The support members 17 are staggered lengthwise on opposite sides of the bus bars.

Each of the improved plug-in type bus bar support members 17 is a one-piece molded body of insulating material comprising an outer surface 61, two parallel end walls 73 and two parallel side walls 75. Three aligned openings 77 (FIG. 13) are provided in the outer surface 61, and another opening 79 is provided in the outer surface which opening 79 is offset from the line of the openings 77. Each of the support members 17 is substantially hollow except for three insulating barriers 81 that are molded integral with the body 61. The barriers 81 are positioned within the body 61 between adjacent openings 77, 79. Four grooves 83 are provided in each of the two opposite side walls 75 for receiving the four bus bars 13, 14 within the bus duct housing. The outer surface 61 of each of the units 17 comprises a raised portion 85 and a shoulder portion 87 which shoulder portion extends around the perimeter of the outer surface. Four legs 89 are molded integral with the support member at the inner side thereof. When each of the plug-in support members 17 is mounted in position, the raised portion 85 thereof is adjacent an opening in the bus duct housing. The shoulder portion 87 and the feet 89 of each of the support members 17 engage the opposite housing parts 5 and 7 respectively to support the member 17 within housing. Lateral support is provided by means of two crimps 90 (FIG. 2) in each of the two opposite sides of the housing 5, 7 that engage the member 17 on opposite sides of one of two projections 91 which are molded on opposite sides of the support member. The bus bars 13, 14 are disposed in the grooves 83 (FIG. 12) and supported between the plurality of support members 17 that are staggered lengthwise within the housing 5, 7 on opposite sides of the bus bars.

As seen in FIGS. 1 and 2, whenever it is desired to tap power off of the bus duct 3, a plug-in unit 4 is mounted on the bus duct housing 5, 7 over one of the plug-in type support members 17. The plug-in unit 4 comprises a housing 97 having a cover 99 secured thereto by means of two screws 101 that pass through openings in the housing and thread into bent-over portions 103 that are stamped out of the sides of the housing. An overhanging part 105 of the cover 99 covers the openings left when the bent-over portions 103 are stamped out of the housing. An insulating support member 107 is supported in the housing 97 on a supporting plate 108 that is positioned over an opening 109 in the base of the housing. The support member 107 and plate 108 are secured to the housing by means of two bolts 111.

Three electrical connectors 115 of similar construction are supported by the insulating support 107. Each of the connectors 115 comprises a one-piece current conducting stab member 117 (FIGS. 3, 4 and 5). Two conducting clip members 119 (FIGS. 6 and 7) are connected to each of the stab members 117 by means of one rivet 120 (FIGS. 1 and 2) that passes through an opening 121 in each of the clip members 119 and an opening 123 in the member 117. A stamped-out portion 125 (FIGS. 6 and 7) on each of the members 119 engages in a second opening 127 (FIG. 3) in the member 117 to prevent rotatable movement of the clips 119.

It is to be noted that the stab member 117 is a one-piece structure having a stab portion 131 at its upper end, a bent-over portion 133 intermediate its ends and a clip support portion 135 at its lower end. Each of the electrical connectors 115 (FIGS. 1 and 2) is supported in the insulating block 107 by means of a screw 139 that passes through a portion 143 of the body of the support member 107 and is screwed through a tapped opening 144 (FIG. 5) in the bent-over portion 133 of the stab member 117.

Another electrical connector indicated generally at 147 (FIG. 2) is connected to a terminal member indicated generally at 149 which parts are supported on the insulating block 107 by means of a screw 151. The electrical connector 147 comprises a connector 151 having two clips 119 supported thereon by means of a rivet 120. As can be seen in FIG. 1, the electrical connector 147 is offset with respect to the line of the electrical connectors 115 to match the offset opening 79 in the plug-in support member 17 thereby ensuring that the plug-in unit 4 can be mounted to the bus duct 3 only in the one position in which position connections of proper polarity are made with the bus bars 13, 14.

When the plug-in unit 4 is mounted in place on the bus duct 3, the electrical connectors 115, 147 pass through the openings 77, 79 respectively in the plug-in type support member 17, and are clipped onto the bus bars 13, 14, respectively (FIG. 2).

The plug-in unit 4 is supported on the bus duct housing 5, 7 by means of two screws 155 that pass through two generally L-shaped brackets 157 that are supported on the housing 5 and that thread into tapped openings in two generally L-shaped brackets 159. The brackets 159 are clipped onto the flanges 9 of the housing 5, 7 by means of stamped-out clip portions 161. The screws 155 are tightened to draw the plug-in unit 5 against the bus duct housing 5, 7.

A three-pole circuit breaker indicated generally at 165 is supported at one end on the insulating block 107 and at the other end on a supporting bracket 169 (FIG. 1) that is welded or otherwise suitably secured to the base of the plug-in unit housing 97. Each of the three pole units of the breaker 165 is electrically connected to one of the connectors 115 by means of a current conducting clip-on structure 166 (FIG. 2) in a manner well known in the art. Conducting lines (not shown) are connected to the circuit breaker 165 and the terminal member 149 to feed power to a suitable load. A handle 167 is provided for permitting manual opening and closing of the contacts (not shown) of the circuit breaker to permit opening and closing of the three-phase circuit that is tapped off of the three-phase conducting bus bars 13.

From the foregoing description, it is apparent that the invention provides an improved system of electrical power distribution. An improved plug-in unit includes an electrical connector that comprises a one-piece stab member that has an upper part that serves as a stab for making an electrical connection with a circuit breaker mounted within the plug-in unit housing, an intermediate part that is bent over to support the stab member on an insulating mounting block and a lower part that extends out through an opening in the bottom of the housing of the plug-in unit. Two spring clips are attached to the lower part of the one-piece stab member for making an electrical connection with a bus bar when the plug-in unit is mounted in operating position on a section of bus duct.

Since numerous changes may be made in the above-described construction and different embodiments may be made without departing from the spirit and scope of the invention, it is intended that all matter contained in the foregoing description or shown in the accompanying drawings shall be interpreted as illustrative and not in a limiting sense.

We claim as our invention:

1. A bus duct plug-in unit comprising, in combination, a housing having an opening in the bottom thereof, an insulating support member supported in said housing over said opening, an electrical connector supported by said insulating support member and comprising a conducting member, said conducting member comprising a one-piece member having an integral first terminal part at the upper end thereof, the lower end of said conducting member extending out through said opening in said housing, an electrical connecting structure disposed at the said lower end of said conducting member, a circuit breaker supported in said housing, said circuit breaker comprising a second terminal part in quick-detachable plug-in type engagement directly with said first terminal part.

2. A bus duct plug-in unit comprising, in combination, a housing having an opening in the bottom thereof, an insulating support member supported in said housing over said opening, an electrical connector supported by said insulating support member and comprising a conducting member, said conducting member comprising a one-piece member having an integral first terminal part at the upper end thereof, the lower end of said conducting member extending out through said opening in the housing, said conducting member having an integral bent-over portion intermediate the said upper and lower ends thereof, means connecting said conducting member at said bent-over portion to said insulating support member, an electrical connecting structure disposed at the said lower end of said conducting member, a circuit breaker supported in said housing, said circuit breaker comprising a second terminal part in quick-detachable plug-in type engagement directly with said first terminal part.

3. A bus duct plug-in unit comprising, in combination, a housing having an opening in the bottom thereof, an insulating support member supported in said housing over said opening, an electrical connector supported by said insulating support member and comprising a stab member, said stab member comprising a one-piece member having a stab portion at the upper end thereof, the lower end of said stab member extending out through said opening in the housing, said stab member having a bent-over portion intermediate the said upper and lower ends thereof, means connecting said stab member at said bent-over portion to said insulating support member, a clip-on type electrical connecting structure disposed at the said lower end of said stab member, a circuit breaker supported in said housing, said circuit breaker comprising a clip-on type terminal in quick-detachable clip-on type engagement directly with said stab member.

References Cited by the Examiner

UNITED STATES PATENTS

| | | | |
|---|---|---|---|
| 1,867,381 | 7/32 | Sadacca | 339—166 |
| 2,038,107 | 4/36 | Harvey | 339—65 |
| 2,161,571 | 6/39 | Harvey | 339—22 X |
| 2,264,075 | 11/41 | Frank | 339—22 |
| 2,281,221 | 4/42 | Anderson | 339—22 X |
| 2,306,353 | 12/42 | Cole et al. | 339—22 |
| 2,309,972 | 2/43 | Messing | 339—76 |
| 2,317,710 | 4/43 | Anderson | 339—176 |
| 2,318,861 | 5/43 | Huguelet | 339—147 |
| 2,443,797 | 6/48 | Miller | 339—170 |
| 2,444,648 | 7/48 | Jackson et al. | 174—72 |
| 2,938,971 | 5/60 | Meacham et al. | 339—22 X |

JOSEPH D. SEERS, *Primary Examiner.*

PATRICK A. CLIFFORD, *Examiner.*